US011055053B2

(12) United States Patent
Mori et al.

(10) Patent No.: US 11,055,053 B2
(45) Date of Patent: Jul. 6, 2021

(54) SYSTEMS AND METHODS FOR DISPLAYING CAPTURED SCREENSHOTS

(71) Applicant: LENOVO (Singapore) PTE LTD., New Tech Park (SG)

(72) Inventors: Hidetoshi Mori, Yokohama (JP); Yuichi Shigematsu, Yokohama (JP); Masaharu Yoneda, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/804,369

(22) Filed: Feb. 28, 2020

(65) Prior Publication Data

US 2020/0319840 A1 Oct. 8, 2020

(30) Foreign Application Priority Data

Feb. 28, 2019 (JP) .............................. JP2019-35810

(51) Int. Cl.
*G06F 3/02* (2006.01)
*G06F 3/14* (2006.01)

(52) U.S. Cl.
CPC .............. *G06F 3/1454* (2013.01); *G06F 3/02* (2013.01); *G06F 3/1423* (2013.01)

(58) Field of Classification Search
CPC . G06F 3/02; G06F 3/04; G06F 3/1423; G06F 3/1454; G06F 3/03547; G06F 3/0481; G06F 3/14; G06F 1/1616; G06F 1/1647; G06F 1/165; G09G 5/14
See application file for complete search history.

(56) References Cited

U.S. PATENT DOCUMENTS

| 8,023,769 B2 * | 9/2011 | Bang | H04N 1/3872 382/284 |
| 2002/0030634 A1 * | 3/2002 | Noda | G09G 5/00 345/5 |
| 2009/0219453 A1 * | 9/2009 | Masuda | H04N 5/45 348/739 |
| 2009/0315867 A1 * | 12/2009 | Sakamoto | G06F 3/03547 345/184 |
| 2010/0086286 A1 * | 4/2010 | Lee | A61B 1/041 386/201 |
| 2014/0101535 A1 * | 4/2014 | Kim | G06F 3/1431 715/234 |
| 2017/0075474 A1 * | 3/2017 | Shigematsu | G06F 3/0485 |
| 2017/0345397 A1 * | 11/2017 | Tsukamoto | G06F 3/147 |
| 2019/0258444 A1 * | 8/2019 | Liu | G02B 5/045 |

(Continued)

FOREIGN PATENT DOCUMENTS

| JP | 2010-211393 A | 9/2010 |
| JP | 2010211393 A * | 9/2010 |

(Continued)

*Primary Examiner* — Joe H Cheng
(74) *Attorney, Agent, or Firm* — Kunzler Bean & Adamson (57) ABSTRACT

Methods, apparatus, systems, and computer program products for displaying captured screenshots are disclosed herein. One method includes capturing, by an information handling device, a set of screenshots of a main display screen of a computing device and displaying the captured set of screenshots on a sub-display screen of the computing device. Apparatus, systems, and computer program products that include and/or perform the methods are also disclosed herein.

20 Claims, 9 Drawing Sheets

(56) References Cited

U.S. PATENT DOCUMENTS

2020/0278872 A1* 9/2020 Shigematsu .......... G06F 3/1446
2020/0310636 A1* 10/2020 Cavenaugh .......... G06F 3/0484
2020/0356259 A1* 11/2020 Mori ................... G06F 3/04897

FOREIGN PATENT DOCUMENTS

| JP | 2014-149699 A |   | 8/2014 |
|----|---------------|---|--------|
| JP | 2014149699 A  | * | 8/2014 |

* cited by examiner

SYSTEMS AND METHODS FOR DISPLAYING CAPTURED SCREENSHOTS

REFERENCE TO RELATED APPLICATION

This application claims priority to Japanese Patent Application No. 2019-035810, filed on Feb. 28, 2019, the contents of which are incorporated herein by reference, in its entirety.

FIELD

The subject matter disclosed herein relates to computing systems and more particularly relates to systems and methods for displaying captured screenshots.

BACKGROUND

Conventionally, various computing devices include a capture function for clipping and saving, as a screenshot, an area specified on a display screen with a pointing device using a mouse as one of the functions used on an information processing apparatus such as a desktop PC or a laptop PC. Further, there has been a need to begin an image editing application or a document creation application for pasting and displaying a captured screen on a display screen in an effort to display the captured screen (referred to hereinafter as a "capture screen").

BRIEF SUMMARY

Various embodiments provide apparatus for displaying captured screenshots. One apparatus includes a first chassis and a second chassis coupled to the first chassis. The first chassis includes a sub-display including a sub-display screen and the second chassis includes a main display including a main display screen. The apparatus further includes a capture unit and a display control unit. The capture unit is configured to capture a set of screenshots of the main display screen and the display control unit is configured to display the captured set of screenshots on the sub-display screen.

Other embodiments provide methods for displaying captured screenshots. One method includes capturing, by an information handling device, a set of screenshots of a main display screen of a computing device and displaying the captured set of screenshots on a sub-display screen of the computing device.

Computer program products for displaying captured screenshots are also included herein. One computer program product includes a computer-readable storage medium that stores code executable by a processor. The executable code includes code to perform capturing a set of screenshots of a main display screen of a computing device and displaying the captured set of screenshots on a sub-display screen of the computing device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Since a capture screen can be displayed as being superimposed on a display screen, on which the original screen with the capture screen clipped therefrom is displayed, the capture screens may be difficult to view. Further, when a user wants to compare multiple capture screens, it is preferred that the capture screens should be displayed side by side so that they do not to overlap one another. However, users have been conventionally required to control the size and layout of each capture screen, resulting in imposing a heavy burden on the user.

The present technology has been made in view of such circumstances and an object thereof is to provide an information processing apparatus capable of presenting a captured screen in a manner that is easier to view. A first aspect of the present technology provides an information processing apparatus including a first chassis and a second chassis, in which the second chassis is coupled to the first chassis so that it can be opened and closed. The information processing apparatus can include a main display provided on the second chassis, a sub-display provided on the first chassis along an edge side of the second chassis, a capture unit that captures a screen in a specified range on a display screen of the main display, and a display control unit which displays, on the sub-display, a capture screen.

A second aspect of the present technology provides a control method for an information processing apparatus that includes a first chassis, a second chassis coupled to the first chassis, a main display provided on the second chassis, and a sub-display provided on the first chassis along an edge side of the second chassis. The control method causes a computer to execute a process that includes capturing a screen in a specified range on a display screen of the main display and displaying, on the sub-display, a capture screen that has been captured.

A third aspect of the present technology provides a program provided to an information processing apparatus including a first chassis, a second chassis coupled to the first chassis, a main display provided on the second chassis, and a sub-display provided on the first chassis along an edge side of the second chassis. The program causes a computer to execute a process of capturing a screen in a specified range on a display screen of the main display and a process of displaying, on the sub-display, a capture screen that has been captured. The above-described aspects of the present technology can present a captured screen to a user in a manner easier to view.

Various embodiments disclosed herein provide information processing apparatus, methods for controlling the information processing apparatus, and programs for execution by the information processing apparatus. The various embodiments are described below with reference to the accompanying drawings. In the following discussion, a laptop PC is utilized as an example of an information processing apparatus; however, various other types of computing systems and/or devices can be utilized as an information processing apparatus.

Figure 1:
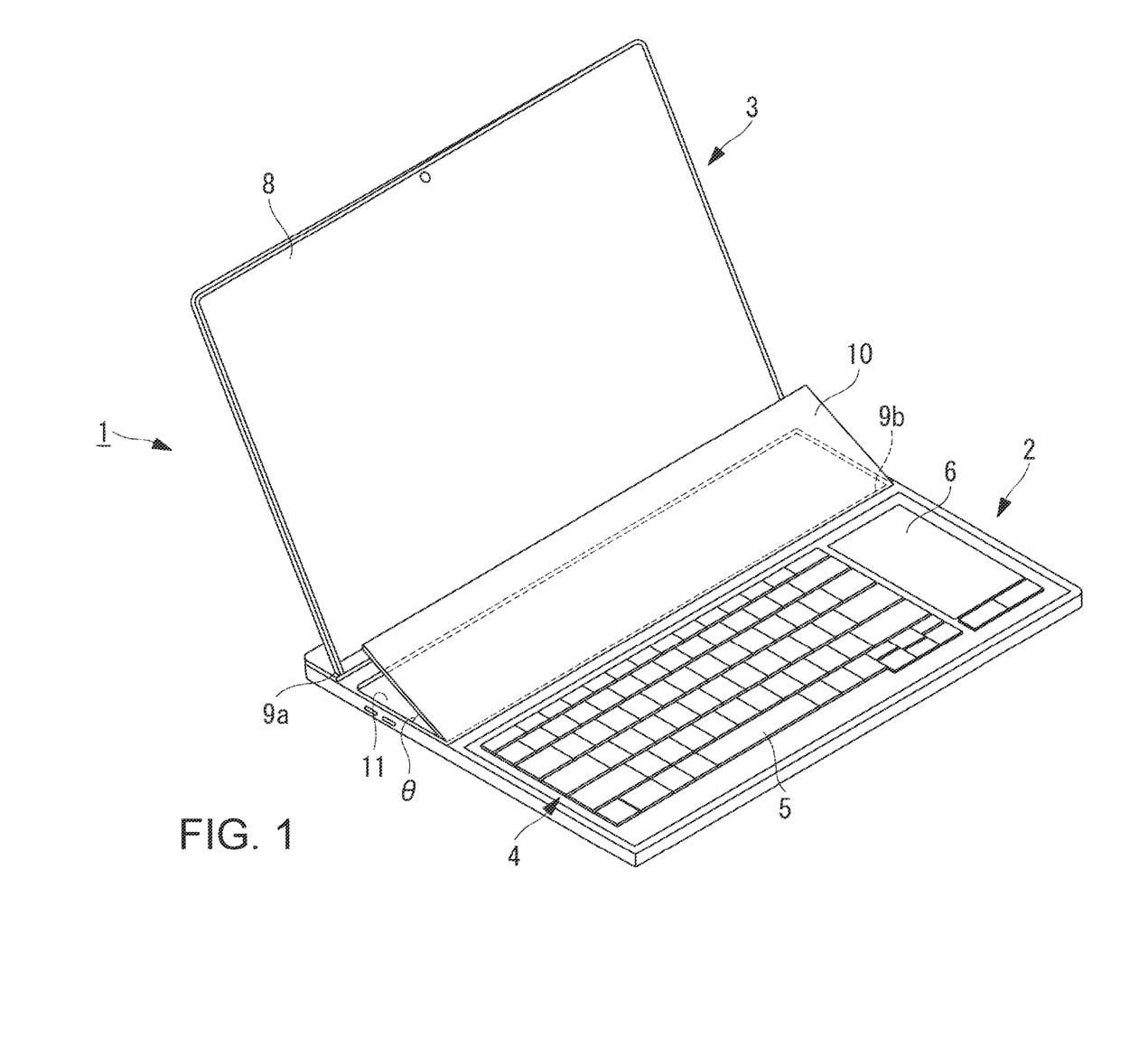
FIG. 1 is a schematic external view of a laptop PC according to one embodiment.

Turning now to the drawings, FIG. 1 is a schematic diagram illustrating an external view of one embodiment of a laptop PC 1. As illustrated in FIG. 1, the laptop PC 1 is a so-called clamshell type personal computing device including a first chassis 2 and a second chassis 3 including a generally rectangular shape. The first chassis 2 and the second chassis 3 are coupled by a coupling part 9a, for example, on the edges or near the edges of each respective chassis. The coupling part 9a is, for example, a hinge for opening and closing the first chassis 2 and the second chassis 3.

A sub-display 10 is provided on the first chassis 2 along the edge side of the second chassis 3. The sub-display 10 is coupled to the first chassis 2, for example, by a coupling part 9b. The coupling part 9b is, for example, a hinge. The coupling part 9b is configured to allowed the sub-display 10, when in a closed state, to be housed in a housing part 11 provided on the upper face of the first chassis 2, and when in an open state, includes an angle θ between a receiving face of the housing part 11 and a back side of the sub-display 10 (e.g., a face on which no display screen is provided). The various embodiments, the angle θ can be any angle within a range of $2° \le θ \le 40°$, for example, among other angles θ and/or ranges of angles θ that are possible and contemplated herein.

For example, the sub-display 10 is configured to be open with respect to and/or relative to the first chassis 2 when the second chassis 3 is open with respect to the first chassis 2. The sub-display 10 may also be configured to be rotated manually around the coupling part 9b. Here, a torque hinge or the like, capable of retaining the sub-display 10 at a predetermined angle, can be suitably used as the coupling part 9b. Further, a biasing member, such as a spring, may be used to place the sub-display 10 into a state of being upwardly biased. In this case, in response to the second chassis 3 is closed, the second chassis 3 can push down the sub-display 10 so that the sub-display 10 is housed in the housing part 11. Further, in response to the second chassis 3 being opened, the sub-display 10 can turn up automatically along with the second chassis 3.

An input device 4 is provided on the first chassis 2. The input device 4 is a user interface (UI) that allows a user to perform one or more input operations. In FIG. 1, a keyboard 5 composed of various keys used to enter characters, commands, and the like, and a touch pad 6 are illustrated as an example of the input device 4. The input device 4 may also include a mouse, a pointing stick, a touch pen, or the like as a pointing device.

The keyboard 5 is provided on the upper face of the first chassis 2 on a side opposite to the second chassis 3 through the sub-display 10. For example, the keyboard 5 is provided substantially in a central region of the upper face of the first chassis 2. The keyboard 5 may be a software keyboard or can be composed of physical keys. The touch pad 6 is provided, for example, on the right side of the keyboard 5 on the upper face of the first chassis 2.

A main display 8 is provided on the second chassis 3 and is configured to display images. The main display 8 is arranged on a face of the sub-display 10 in a manner so that the second chassis 3 is closed with respect to the first chassis 2.

Figure 2:
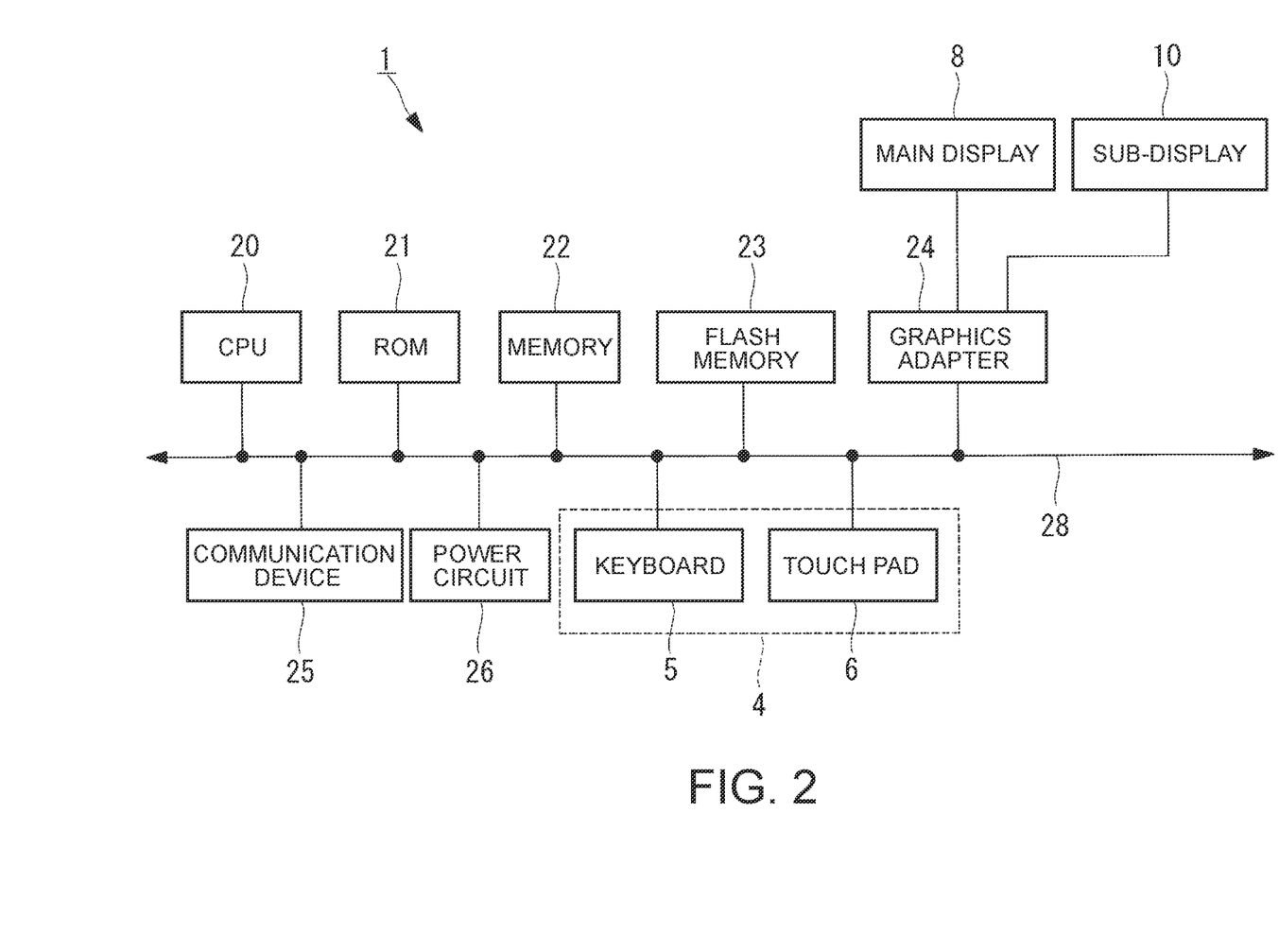
FIG. 2 is a diagram schematically illustrating the hardware configuration of the laptop PC according to one embodiment.

Referring to FIG. 2, FIG. 2 is a diagram schematically illustrating the hardware configuration of the laptop PC 1 according to one embodiment. The laptop PC 1 includes a Central Processing Unit (CPU) 20, a Read Only Memory (ROM) 21, a memory 22, a flash memory 23, a graphics adapter 24, the main display 8, the sub-display 10, a communication device 25, a power circuit 26, and the input device 4. These components are coupled to and/or in communication with one another via a bus 28.

The CPU 20 is configured to control the laptop PC 1 via an Operating System (OS) stored in the flash memory 23. That is, the CPU 20 is connected to the various components via the bus 28 and is configured to execute one or more processes based on various programs stored in the flash memory 23.

The ROM 21 stores a Basic Input/Output System (BIOS), various data, and the like. The memory 22 includes a cache memory and a Random Access Memory (RAM). The memory 22 is a writable memory that is used as a work area for the CPU 20 to read an execution program and write data processed by the execution program.

The flash memory 23 stores a multi-window OS for controlling the laptop PC 1, various drivers for hardware operations of peripheral devices, utility programs, various application programs, and the like. Note that the laptop PC 1 may include any other storage, such as a Hard Disk Drive (HDD), as a storage alternative to the flash memory 23.

The graphics adapter 24 is configured to convert display information to a video signal controlled by the CPU 20. The graphics adapter 24 is configured to output the converted video signal to the main display 8 and the sub-display 10.

The main display 8, in various embodiments, includes a Liquid Crystal Display (LCD), an Organic Light-Emitting Diode (OLED) display, or the like, which is configured to display, as an image, the video signal from the graphics adapter 24 controlled by the CPU 20. Further, the main display 8 may be configured as a touch panel including an input detection function, such as a touch sensor.

The sub-display 10, in various embodiments, includes an LCD, an OLED display, or the like, to display, as an image, the video signal from the graphics adapter 24 under controlled by the CPU 20. The sub-display 10 may also be configured as a touch panel including an input detection function, such as a touch sensor. Further, the sub-display 10 may be configured to accept input through a touch pen or stylus.

The communication device 25 is configured to communicate with one or more other devices. The power circuit 26 includes an AC adapter, a battery, a charger for charging the battery, a DC/DC converter, and the like, to supply power to each component under controlled by the CPU 20.

An input signal is generated in response to receiving a user input via the keyboard 5 and/or the touch pad 6 and can constitute an input to the input device 4, which is then is transmitted to the CPU 20 via the bus 28. The configuration and connection example of the laptop PC 1 illustrated in FIG. 2 are merely examples of a laptop PC 1, and the present disclosure is not limited to these examples.

Figure 3:
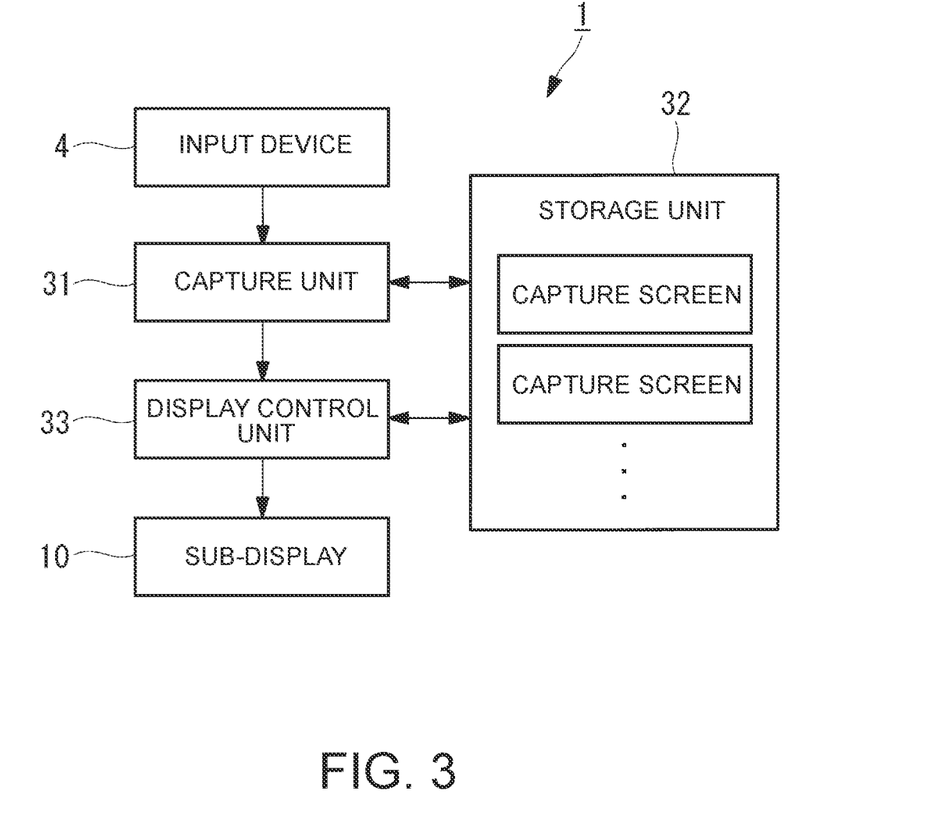
FIG. 3 is a functional configuration diagram schematically illustrating some of the functions of the laptop PC according to an embodiment.

FIG. 3 is a functional block diagram schematically illustrating at least some of the functions of the laptop PC 1 according to various embodiments. Various functions may be implemented by storing, on a computer-readable storage medium, processes for implementing the various functions described below in the format of a program, which can written into the RAM and executed by the CPU 20, or the like processor. Note that a form of pre-installing the program on a storage medium, such as the ROM or the flash memory 23, a form of providing the program in a state of being stored on a computer-readable storage medium, a form of delivering the program through wired or wireless communication means, or the like may be adopted. The computer-readable storage medium, in various embodiments, is a magnetic disk, a magneto-optical disk, a CD-ROM, a DVD-ROM, a semiconductor memory, or the like devices.

As illustrated in FIG. 3, the laptop PC 1 according to one embodiment includes, among other components, a capture unit 31, a storage unit 32, and a display control unit 33. In various embodiments, in response to a partial area or a whole area is specified on the main display 8 with a pointing device, such as a mouse, the capture unit 31 saves a screen of the specified area into the storage unit 32 as an image file or a screenshot.

The area specification method may be, for example, to display, on the main display 8, a size-changeable, position-adjustable rectangle that allows and/or enables a user to adjust the size and/or position of this rectangle using the pointing device (e.g., a mouse) in an effort to specify a target area. Further, the user may use the pointing device or mouse to operate a pointer or cursor displayed on the main display 8 with a drag-and-drop operation to create a rectangle including a desired and/or target size in a desired and/or target position to specify the target area. Alternatively, the user may move the mouse while holding down one or more function key(s), such as an Fn key, to specify a target area. Note that the specification method for capturing a target area is not limited to the above examples, and various other known techniques can be utilized. The storage unit 32 stores the image file of a capture screen as a screenshot screen captured by the capture unit 31.

The display control unit 33 displays, on the sub-display 10, the capture screen captured by the capture unit 31. In response to displaying the capture screen on the sub-display 10, the display control unit 33 may create a scaled capture screen by scaling up or scaling down the capture screen and may further display the scaled capture screen on the sub-display 10. The scaled capture screen may be created by scaling down the capture screen to fall within a displayable range of the sub-display 10 or by scaling up or scaling down the capture screen to fall within a predetermined display frame provided as part of the sub-display 10.

Figure 4:
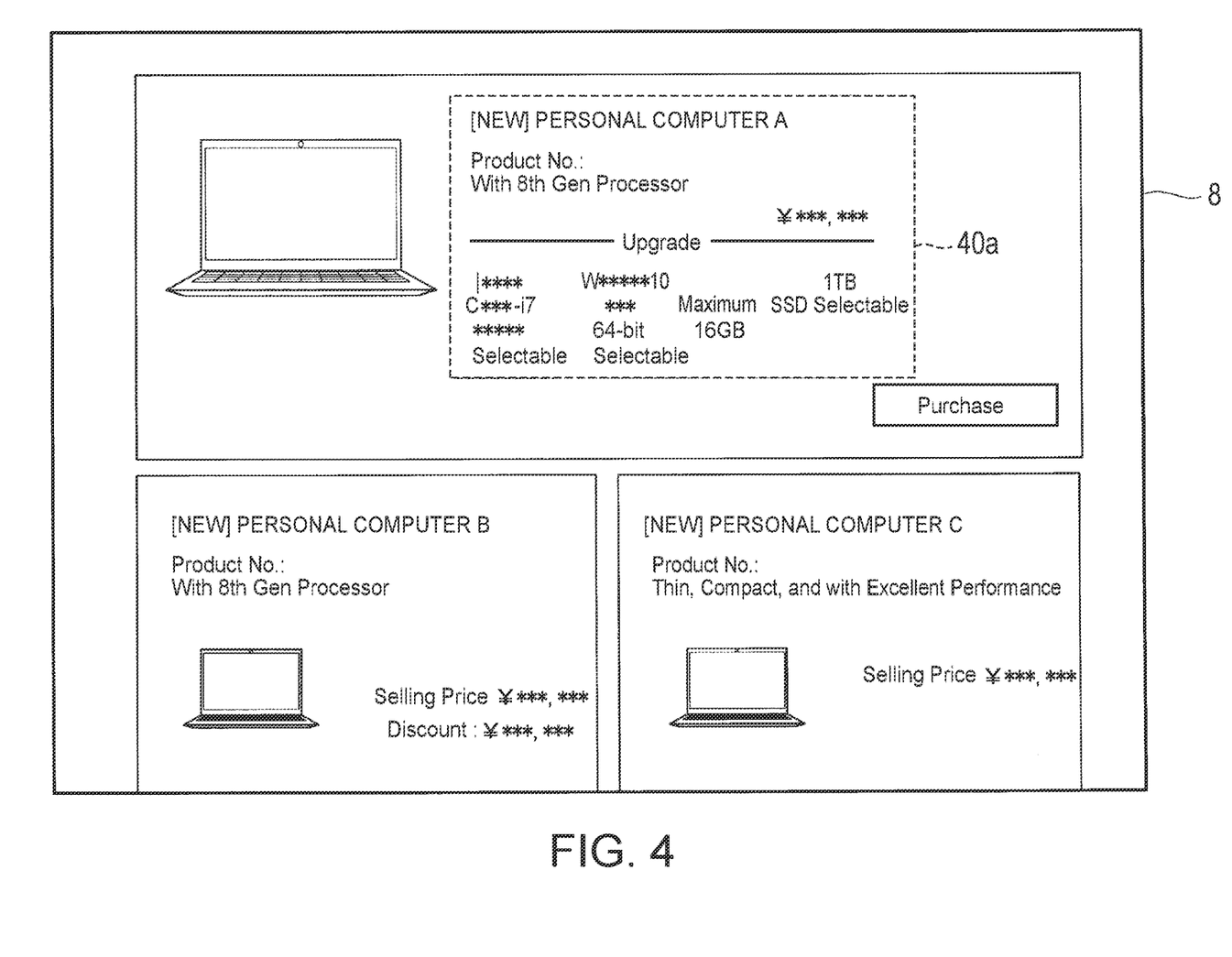
FIG. 4 is a diagram illustrating a display example of a main display on the laptop PC according to one embodiment.
Figure 5:
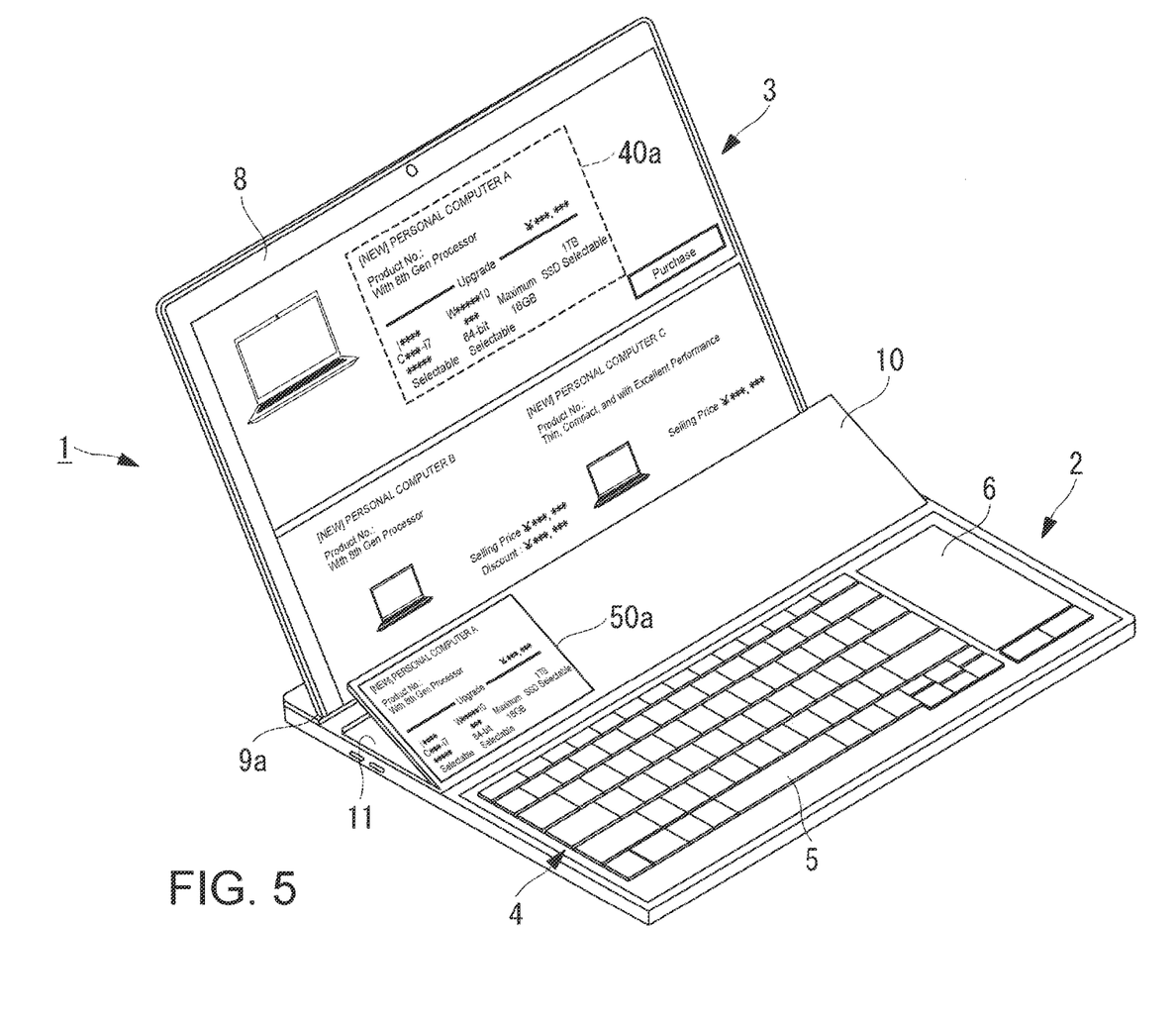
FIG. 5 is a diagram illustrating a display example of a sub-display including a partial area specified as a capture range on the main display in the laptop PC according to an embodiment.

An example image displayed on the main display 8 is illustrated in FIG. 4. An example image displayed on the sub-display 10 when a partial area 40a is specified as a capture range on the display screen of the main display 8 is illustrated in FIG. 5. As illustrated, a capture screen 50a of the specified area 40a is displayed on the sub-display 10 in response to the user operating the input device 4 on the main display 8. The capture screen 50a may be a scaled capture screen obtained by scaling the capture screen, as discussed above.

Figure 6:
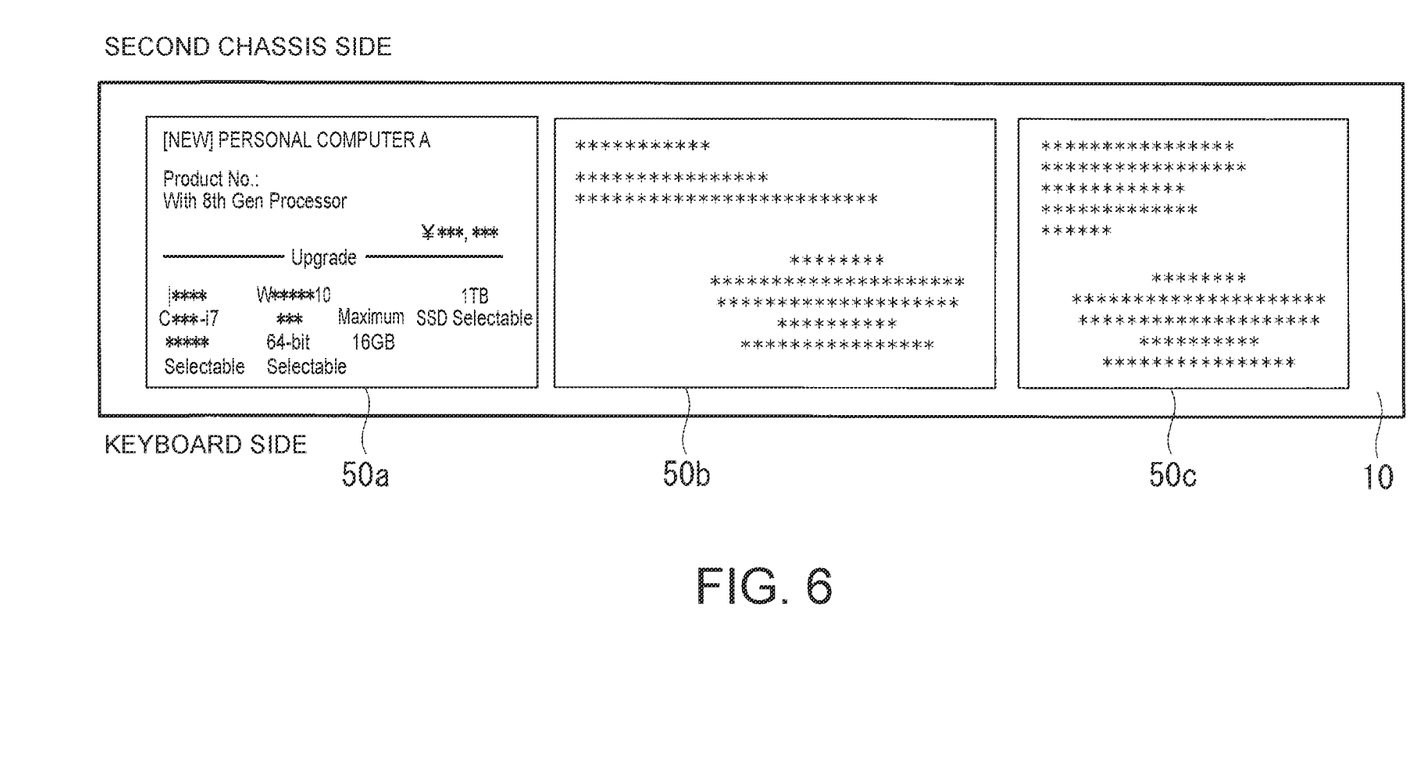
FIG. 6 is a diagram illustrating a display example of the sub-display including multiple capture screens are displayed without overlapping one another in the laptop PC according to one embodiment.

For example, when multiple capture screens exist, the display control unit 33 displays, on the sub-display 10, the multiple capture screens side by side so that the capture screen do not to overlap one another. FIG. 6 is a diagram illustrating a display example of the sub-display 10 when multiple non-overlapping capture screens 50a, 50b, 50c are displayed.

When displaying the multiple capture screens on the sub-display 10, the display control unit 33 may scale down and display, on the sub-display 10, the capture screens so that the multiple capture screens do not overlap one another. When all the capture screens cannot be displayed on the sub-display 10, even if the display control unit 33 reduces each of the capture screens at a predetermined rate and displays the reduced capture screens on the sub-display 10, the capture screens may be displayed overlapping one another.

Figure 7:
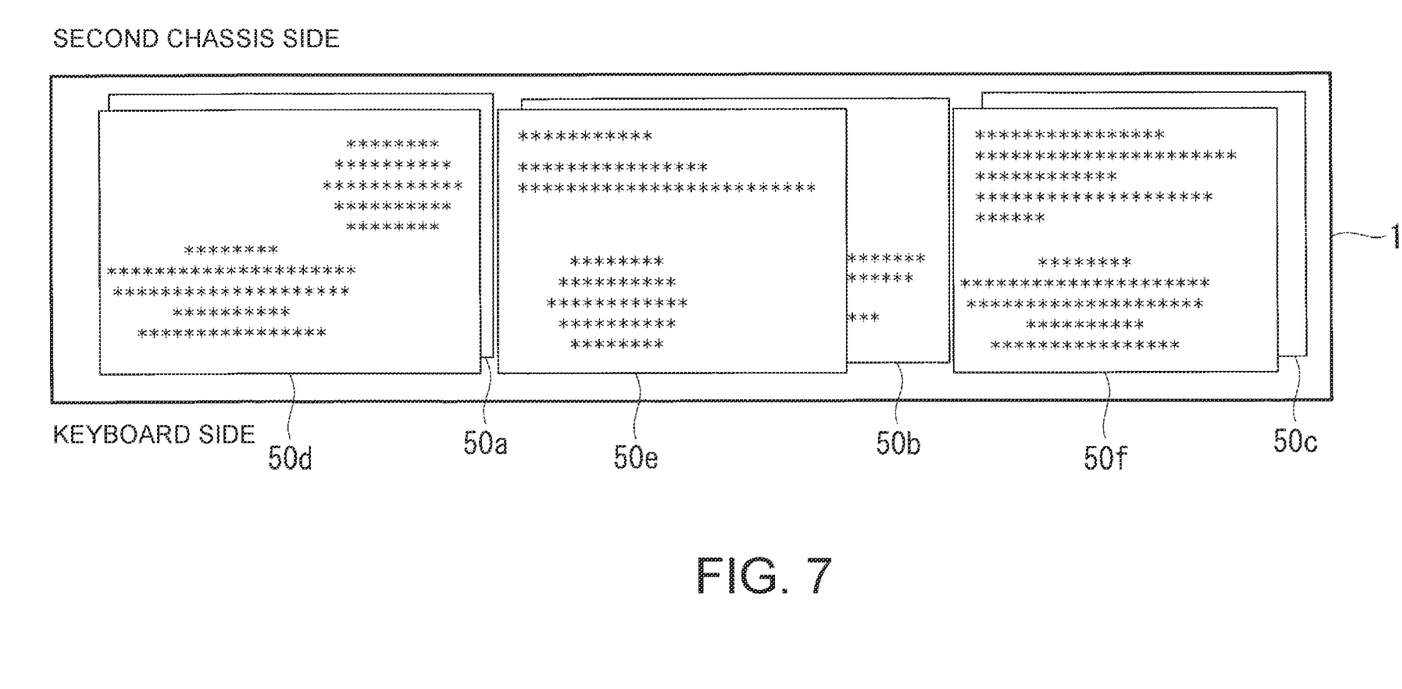
FIG. 7 is a diagram illustrating a display example of the sub-display including multiple capture screens displayed to overlap one another in the laptop PC according to an embodiment.

FIG. 7 is a diagram illustrating a display example of the sub-display 10 when multiple capture screens are displayed overlapping one another. In FIG. 7, for example, the multiple capture screens may be displayed in positions that place older capture screens 50a, 50b, and 50c in the background and that place newer capture screens 50d, 50e, and 50f in the foreground.

Further, in response to receiving an input defining a predetermined command for a full display, the display control unit 33 displays, on the main display 8, the capture screens being displayed on the sub-display 10. In an example, as illustrated in FIG. 7, in which the capture screens 50a through 50f are displayed on the sub-display 10 in such a manner that some of the capture screens 50a through 50f overlap one another. Here, when the predetermined command for full display is received, the display control unit 33 displays, on the main display 8, all of the capture screens 50a to 50f being displayed on the sub-display 10 in a manner that tiles the capture screens 50a through 50f It is preferred that the display control unit 33 should display, on the main display 8, each capture screen in the same size as it was captured without being reduced. However, when some of capture screens overlap due to the size limitations of the main display 8, the capture screens 50a through 50f may be displayed by reducing all or some of the capture screens so that the capture screens do not overlap one another.

The predetermined command for full display may be input, for example, by operating a predetermined key provided on the keyboard 5. The predetermined key can be set appropriately, or may be a combination of two or more keys. The Fn key is an example of a predetermined key. The predetermined command for full display may also be an operation to tap or swipe the capture screen 50a, or the like, displayed on the sub-display 10. Further, the display control unit 33 may display, on the main display 8, all the capture screens being displayed on the sub-display 10 while the predetermined key is being operated (e.g., is held down or depressed). In some embodiments, one or some of capture screens selected from the multiple capture screens displayed on the sub-display 10 may be displayed on the main display 8.

Further, the layout and size of capture screens displayed on the sub-display 10 and the main display 8 may be changeable. For example, the display control unit 33 can change the layout and/or size of the capture screens according to input from the pointing device or mouse. For example, a target capture screen may be selected with a mouse pointer displayed on the sub-display 10 by moving the capture screen to a predetermined position by performing a "drag-and-drop" operation.

In an example in which multiple capture screens are displayed overlapping one another on the sub-display 10 or the main display 8, when a capture screen other than the capture screens displayed in the foreground is selected with the mouse pointer or the like, the display control unit 33 may display the selected capture screen in the foreground.

The size of each capture screen may be changed by dragging and dropping an edge of the capture screen with the mouse. Note that changing the size and layout of each capture screen is not limited to the above examples, and various other methods for modifying the size and/or layout of a capture screen can be utilized.

Figure 9:
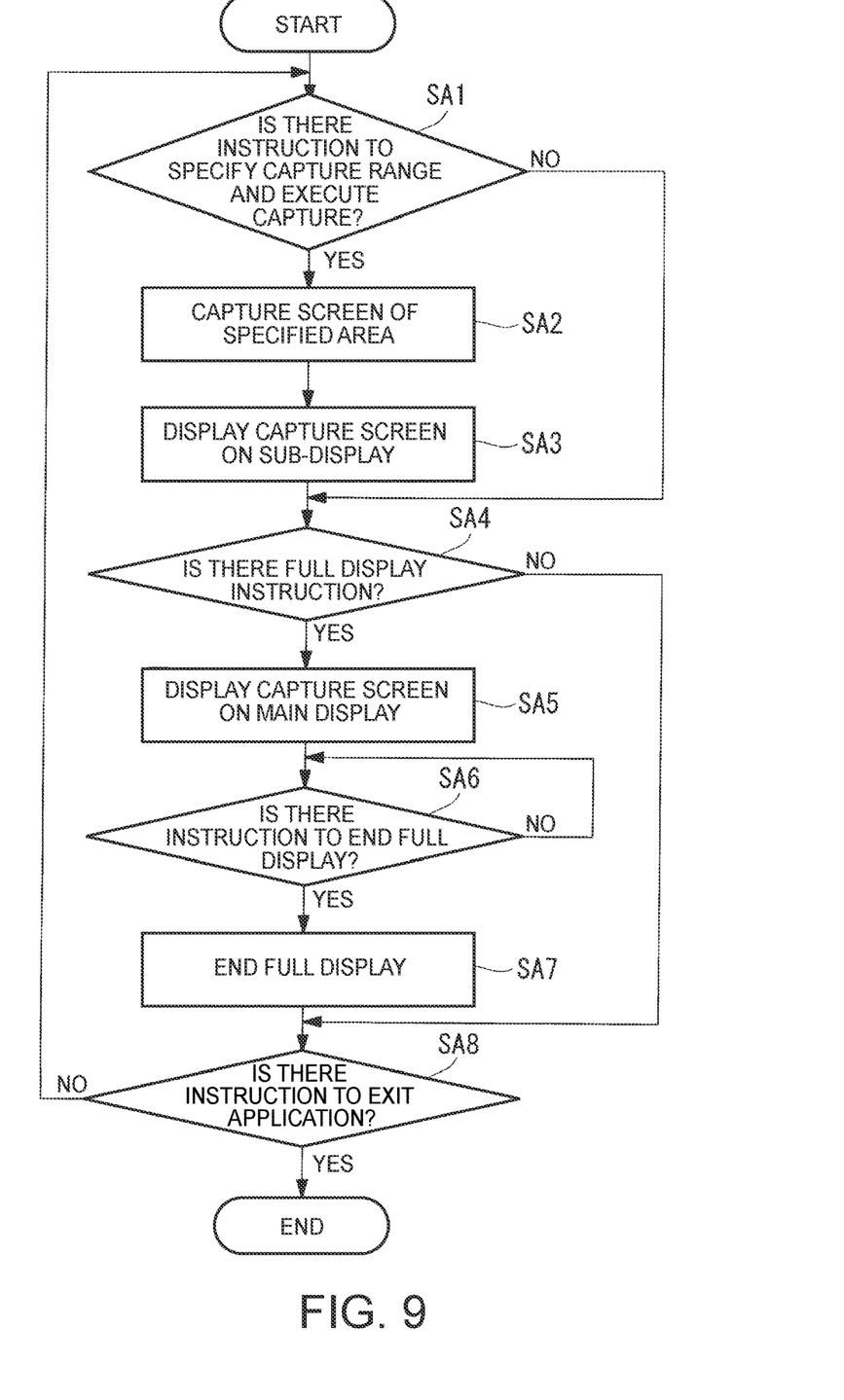
FIG. 9 is a flowchart illustrating an example of a method for executing a capture process performed by a laptop PC according to an embodiment.

Next, processing related to capture executed by the laptop PC 1 according to the embodiment will be described with reference to FIG. 9. FIG. 9 is a flowchart illustrating an example of a capture process executed by the laptop PC 1. For example, the processing related to a capture process can be started when a capture application start instruction is input by a user and ended when a capture application exit instruction is input by the user. Since there are known techniques for specific operations to start and exit the application, the description thereof is omitted here.

In response to receiving, via input device 4, a command to start a capture application, determination is made whether a partial area or the whole area of the display screen displayed on the main display 8 is specified as a capture area, and whether a capture execution instruction has been input or not (SA1). In response to the capture execution instruction being input (SA1: YES), the capture unit 31 captures, as a screenshot, a screen of the area specified as the capture area (SA2). The capture screen is stored in the storage unit 32 as an image file.

Subsequently, the display control unit 33 displays, on the sub-display 10, the capture screen as the captured screen (SA3). At this time, a scaled capture screen may be created and displayed on the sub-display 10. Thus, for example, the capture screen is displayed on the sub-display 10, as illustrated in FIG. 5.

Next, a determination of whether a full display instruction has been input or not input is performed (SA4). When no full display instruction is input (SA4: NO), it is determined whether an instruction to exit the application has been input or not input (SA8). When no instruction to exit the application is input (SA8: NO), the procedure returns to block SA1.

The specification of the capture area and the capture execution instruction are repeated so that multiple capture screens desired by the user will be displayed on the sub-display 10. In the display processing of block SA3, when all capture screens can be displayed without overlapping one another on the sub-display 10, even without reducing the size of each capture screen, the display control unit 33 displays, on the sub-display 10, all the capture screens in a manner that does not to reduce the size.

When the capture screens overlap one another or the capture screens cannot be displayed without size reduction, the display control unit 33 displays, on the sub-display 10, scaled capture screens obtained by scaling down the capture screens. Further, when the capture screens will overlap one another, even if each capture screen is reduced at a predetermined limit reduction rate, the display control unit 33 displays the multiple capture screens overlapping one another, as illustrated in FIG. 7. Note that these display modes are just examples and the capture screens may be displayed according to other rules.

Further, In response to a predetermined key (for example, the Fn key) is depress by the user to input a command for full display (SA4: YES), the display control unit 33 displays, on the main display 8, capture screens being displayed on the sub-display 10 (SA5). Here, only the capture screen(s) selected from among the multiple capture screens displayed on the sub-display 10 may be displayed on the main display 8.

Figure 8:
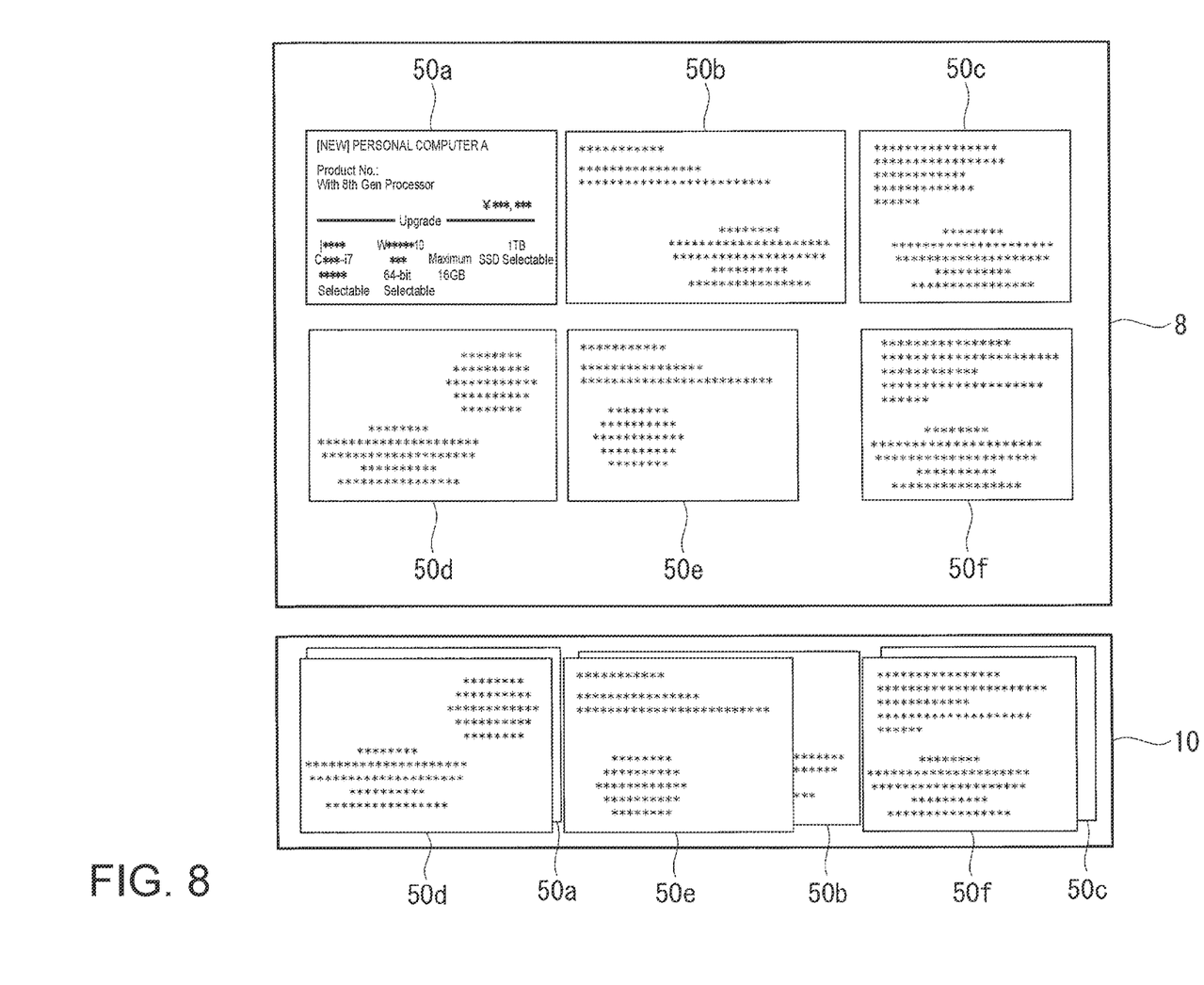
FIG. 8 is a diagram illustrating a display example of the main display when an input command for full display is input in the laptop PC according to one embodiment.

FIG. 8 illustrates one example of multiple capture screens 50a through 50f being displayed on the sub-display 10 are also displayed on the main display 8. Here, it is preferred that the display control unit 33 displays the multiple capture screens on the main display 8 without reducing the size of any capture screens. However, when some of the capture screens overlap one another due to the size limitations of the main display 8, the display control unit 33 may reduce all or some of the capture screens to display the capture screens 50*a* through 50*f* without overlapping one another. Even in this case, the user can operate the pointing device or mouse to change the size and layout of each of the capture screens. Thus, the user can change the size and layout of each capture screen on the main display 8 to make it easier to view the capture screens.

Next, a determination is made whether an instruction to end the full display has been input or not input (SA6). In response to an instruction having not been input (SA6: NO), block SA6 is repeated. In response to an instruction having been input (SA6: YES), the full display is ended (SA7). In various embodiments, the display on the main display 8 is maintained until the instruction to end the full display is input.

The instruction to end the full display may be input or triggered, for example, by releasing the predetermined key used to give the full display instruction, the instruction to end the full display may be input, and/or by performing a predetermined input operation to tap or swipe a capture screen or the like displayed on the sub-display 10.

In block SA8, a determination is made whether the capture application exit instruction has been input or not input. In response to the instruction having not been input (SA8: NO), the procedure returns to block SA1. In response to the instruction having been input (SA8: YES), the capture processing is ended.

As discussed above, according to the various embodiments of the laptop PC 1, the screen of a specified area is captured by the user as a screenshot on the main display 8 and the captured screen is displayed on the sub-display 10. Since the capture screen is displayed on the sub-display 10, rather than on the main display 8, the display screen displayed on the main display 8 is not affected by the capture screen. Therefore, for example, the user can search for desired information by using the main display 8 and can further perform a capture operation on information of interest to display desired information on the sub-display 10. This can lead to presenting a captured screen to the user in a manner that is easier to view.

For example, when the user is thinking about buying a home appliance, the user may want to display the product prices, specs, and the like for comparison. In such a situation, the user can specify relevant portions of websites in which the specs and prices of respective products are described and execute captures to display capture screens that include the specs, prices, and the like of the products of interest side by side on the sub-display 10. This allows the user to make easier product comparisons. Further, even when multiple capture operations are performed, information search can be performed easily by using the entire display area of the main display 8 since the display area of the main display 8 is not affected by the capture screens.

Further, when the command for a full display is input, all the capture screens are displayed as tiles on the main display 8 (see FIG. 8). Since the main display 8 is larger in size than the sub-display 10, the user can check the capture screens on the larger display screen, which can lead to presenting the capture screens to the user in a manner that is further easier to view.

While the present technology has been described in each form, the technical scope of the present technology is not limited to the scope of the above-described aspects, and various combinations, changes, or improvements can be added without departing from the scope of the technology. The forms to which the combinations, changes, or improvements are added shall also be included in the technical scope of the present technology.

Embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a first chassis and a second chassis coupled to the first chassis, wherein:
the first chassis comprises a sub-display including a sub-display screen, and
the second chassis comprises a main display including a main display screen;
a capture unit configured to capture a plurality of screenshots of the main display screen; and
a display control unit configured to display the plurality of captured screenshots side-by-side on the sub-display screen in non-overlapping positions,
wherein:
the display control unit is configured to reduce a size of at least one captured screenshot in the plurality of captured screenshots a predetermined amount, and
at least a portion of each of said capture unit and said display control unit comprises one of a set of hardware circuits, a set of programmable hardware devices, and executable code stored on a set of non-transitory computer-readable storage media.

2. The apparatus of claim 1, wherein:
to display the plurality of captured screenshots side-by-side on the sub-display screen in the non-overlapping positions; and
the display control unit is further configured to reduce a size of each of the plurality of captured screenshots.

3. The apparatus of claim 2, wherein:
the size of each of the plurality of captured screenshots is reduced the predetermined amount.

4. The apparatus of claim 1, wherein:
to display the plurality of captured screenshots side-by-side on the sub-display screen in the non-overlapping positions, the display control unit is configured to reduce a size of two or more captured screenshots in the plurality of captured screenshots the predetermined amount.

5. The apparatus of claim 1, wherein:
the display control unit is further configured to display, on the main display screen, all of the captured screenshots in the plurality of captured screenshots that are currently being displayed on the sub-display screen in response to receiving a full display command.

6. The apparatus of claim 5, wherein:
the apparatus further comprises a keyboard including a plurality of keys; and
the full display command is received in response to a user actuating a predetermined key on the keyboard.

7. The apparatus of claim 5, wherein in displaying, on the main display screen, all of the captured screenshots in the plurality of captured screenshots that are currently being displayed on the sub-display screen the control unit is further configured to:
   reduce the size of each of the plurality of captured screenshots.

8. A method, comprising:
capturing, by a processor, a plurality of screenshots of a main display screen of a computing device; and
displaying the plurality of captured screenshots side-by-side in non-overlapping positions on a sub-display screen of the computing device,
wherein displaying the plurality of captured screenshots on the sub-display screen side-by-side in the non-overlapping positions comprises reducing a size of at least one of the plurality of captured screenshots a predetermined amount.

9. The method of claim 8, wherein:
displaying the plurality of captured screenshots on the sub-display screen side-by-side in the non-overlapping positions further comprises reducing the size of each of the plurality of captured screenshots.

10. The method of claim 9, wherein:
reducing the size of each of the plurality of captured screenshots comprises reducing the size of each of the plurality of captured screenshots the predetermined amount.

11. The method of claim 8, wherein:
displaying the plurality of captured screenshots on the sub-display screen side-by-side in the non-overlapping positions comprises reducing the size of two or more captured screenshots in the plurality of captured screenshots the predetermined amount.

12. The method of claim 8, wherein:
the method further comprises displaying, on the main display screen, all of the captured screenshots in the plurality of captured screenshots that are currently being displayed on the sub-display screen in response to receiving a full display command.

13. The method of claim 12, wherein:
the computing device comprises a keyboard including a plurality of keys; and
the full display command is received in response to a user actuating a predetermined key on the keyboard.

14. The method of claim 12, wherein displaying, on the main display screen, all of the captured screenshots in the plurality of captured screenshots that are currently being displayed on the sub-display screen comprises:
reducing the size of each of the plurality of captured screenshots.

15. A computer program product including a non-transitory computer-readable storage medium that stores code executable by a processor, the executable code comprising code to perform:
capturing a plurality of screenshots of a main display screen of a computing device; and
displaying the plurality of captured screenshots side-by-side in non-overlapping positions on a sub-display screen of the computing device,
wherein displaying the plurality of captured screenshots on the sub-display screen side-by-side in the non-overlapping positions comprises reducing a size of at least one of the plurality of captured screenshots a predetermined amount.

16. The computer program product of claim 15, wherein:
displaying the plurality of captured screenshots side-by-side in the non-overlapping positions on the sub-display screen comprises reducing the size of each of the plurality of captured screenshots.

17. The computer program product of claim 16, wherein:
reducing the size of each of the plurality of captured screenshots comprises reducing the size of each of the plurality of captured screenshots the predetermined amount.

18. The computer program product of claim 15, wherein:
the executable code further comprises code to perform:
displaying, on the main display screen, all of the captured screenshots in the plurality of captured screenshots that are currently being displayed on the sub-display screen in response to receiving a full display command.

19. The computer program product of claim 18, wherein:
the computing device comprises a keyboard including a plurality of keys; and
the full display command is received in response to a user actuating a predetermined key on the keyboard.

20. The computer program product of claim 15, wherein:
displaying the plurality of captured screenshots on the sub-display screen side-by-side in the non-overlapping positions comprises reducing a size of two or more captured screenshots in the plurality of captured screenshots a predetermined amount.

* * * * *